INVENTOR:
JOSEPH FOLK
BY
Spencer, Johnston, Cook & Root.
ATT'YS

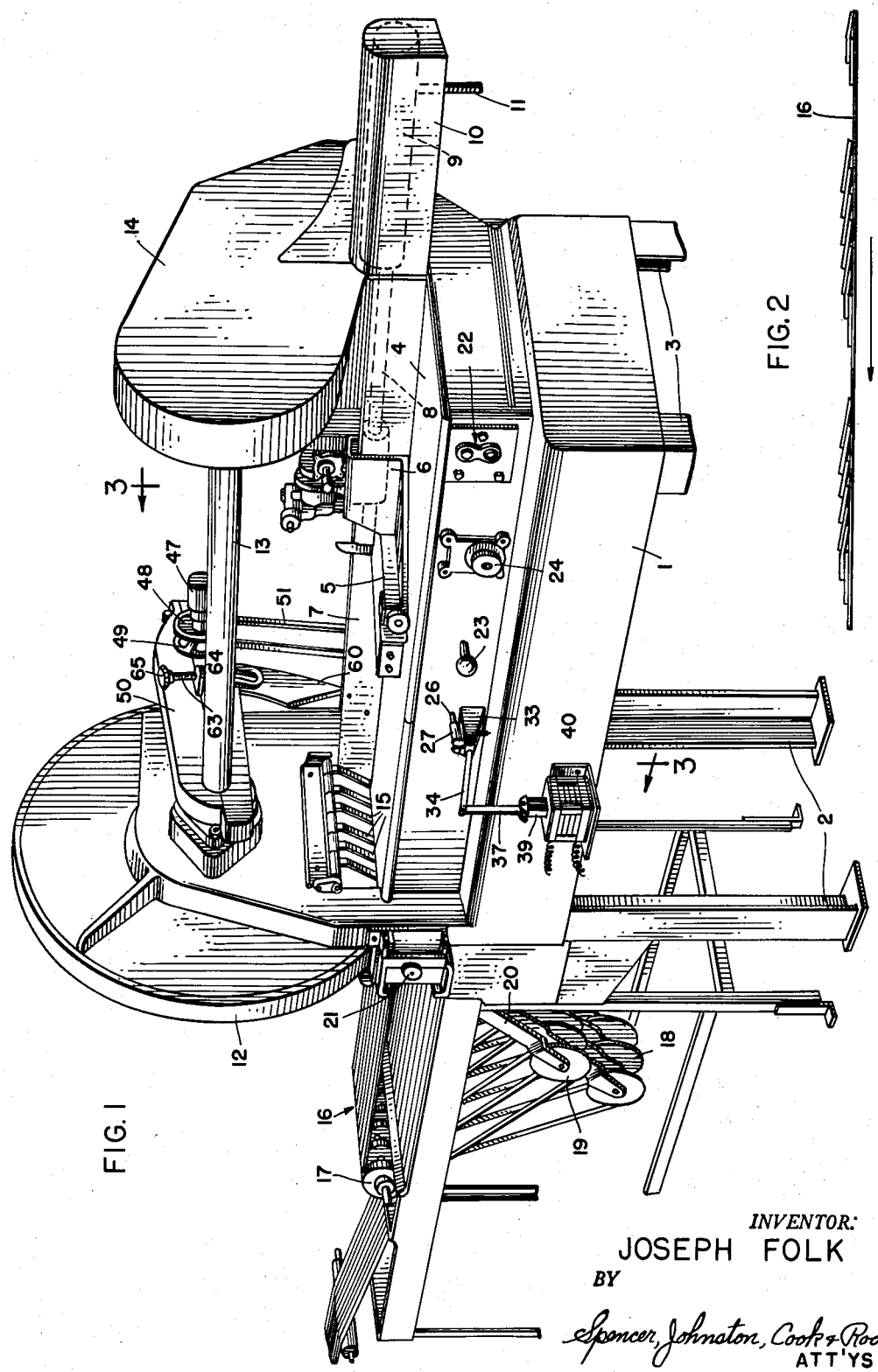

May 8, 1956
J. FOLK
2,744,553
SLICING MACHINE HAVING MEANS FOR REGULATING
THE NUMBER OF SLICES IN A GROUP
Filed May 17, 1951
3 Sheets-Sheet 3
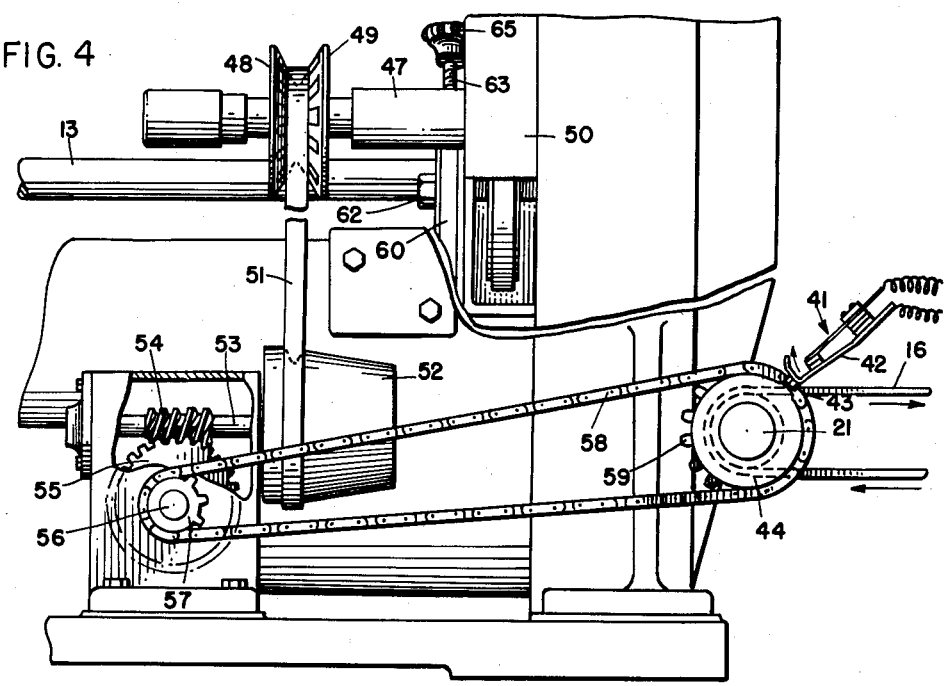
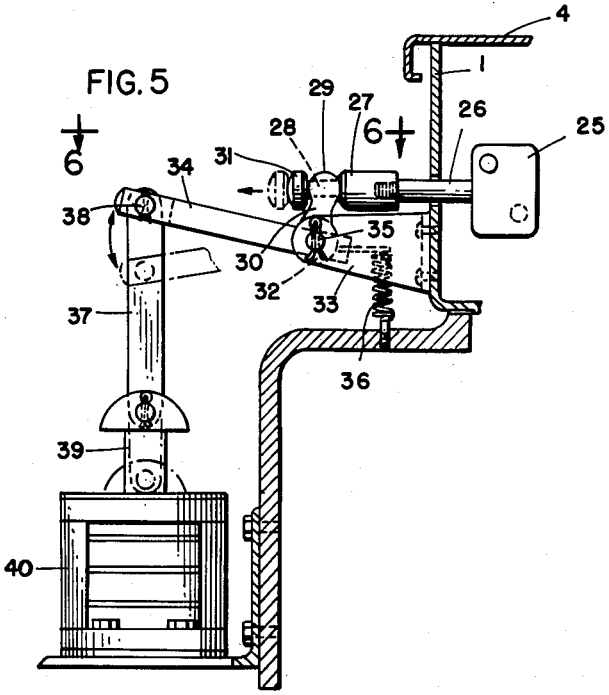
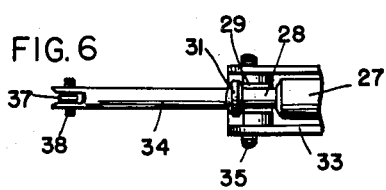
INVENTOR:
JOSEPH FOLK
BY
Spencer, Johnston, Cook & Root.
ATT'YS United States Patent Office 2,744,553
Patented May 8, 1956

2,744,553

SLICING MACHINE HAVING MEANS FOR REGULATING THE NUMBER OF SLICES IN A GROUP

Joseph Folk, La Porte, Ind., assignor to U. S. Slicing Machine Company, Inc., La Porte, Ind., a corporation of Indiana Application May 17, 1951, Serial No. 226,809

2 Claims. (Cl. 146—94)

This invention relates in general to improvements in slicing machines and is directed particularly to an improvement for automatically grouping slices of a substance at predetermined intervals and for controlling the number of slices in each group.

While the present invention may have general application to the various types of slicing machines for slicing various substances, it has been disclosed herein for purposes of illustration as adapted for use in connection with a machine designed especially for slicing bacon. It will be obvious, however, that different kinds of meat as well as other substances may be sliced on the disclosed machine without in any way altering or distinguishing from the improvement embodying the invention.

It has become a customary practice in certain industries and, in particular, the meat industry, to package sliced meat in individual packages of predetermined weights such as one-half pound, one pound, and the like.

Large slicing machines for bacon wherein a side of bacon is advanced continuously toward the knife are provided with means for regulating the rate of speed of the substance pusher so that the slices severed from the substance will be of a predetermined thickness. A determination is made that a certain number of slices of a certain thickness will have predetermined weight. The slices drop onto a continuously moving conveyor which automatically shingles the slices. Beyond this conveyor there is usually provided a second conveyor to which the shingled slices are transferred and which has a number of weighing scales on each side thereof. Several operators are required to remove from the conveyor a certain number of slices which are supposed to have a predetermined weight. The operators usually have available some meat scraps which may be added to the group of slices if the original group removed has insufficient weight.

The feeding mechanism for the substance pusher may have its speed increased or decreased depending upon the thickness of the slices desired. A control may be provided to start and stop the feeding of the pusher but this control is manual and is used primarily for starting and stopping the feed at the beginning and end of a given operation. In order to group the slices so that each group contains a predetermined number of slices, it would be necessary for an operator to be in attendance constantly and mentally retain the number of slices cut and manually stop the feed at predetermined intervals. The present invention is directed to a mechanism which will automatically group the slices in shingled formation and will also regulate the number of slices in each group without varying the thickness thereof.

It is, therefore, one of the principal objects of the present invention to provide a slicing machine with means for automatically interrupting the operation of the pusher advancing means at predetermined intervals in order that the resulting slices will be grouped in accordance with the weight which each group is to have.

Another object of the invention is to provide in a slicing machine a mechanism for interrupting the operation of the substance advancing means at predetermined intervals for the purpose of grouping the slices and to provide further an adjusting device for regulating the intervals between the interruptions.

A further object of the invention is to provide in a slicing machine electrically operated means for automatically interrupting the operation of the substance advancing means at predetermined intervals whereby the slices in shingled formation will be grouped in accordance with a predetermined weight.

Still another object of the invention is to provide in a slicing machine having fluid means for advancing the pusher and the substance toward the knife, means for automatically interrupting the flow of fluid for the purpose of stopping the advancement of the substance toward the knife at predetermined intervals whereby a grouping of the slices may be accomplished.

A still further object of the invention is to provide automatic means for interrupting the flow of fluid which advances the substance toward the knife of a slicing machine wherein electrical means are utilized to close and open a valve in the fluid line at predetermined intervals.

Still another and more specific object of the invention is to provide a slicing machine having a fluid means for advancing the pusher and substance toward the knife with an electrical circuit wherein a switch is periodically closed to energize a solenoid for operating a valve and stop the flow of fluid. The switch may be closed momentarily but for a sufficient time to cause a space between certain slices on the constantly moving conveyor resulting in a plurality of groups each containing a predetermined number of slices.

Other objects and advantages of the invention will become apparent upon reading the following description taken in conjunction with the accompanying drawings in which:

Fig. 1 is a perspective view of one form of slicing machine embodying the present invention;

Fig. 2 is a fragmentary elevational view of the conveyor illustrating the manner in which a predetermined number of slices may be grouped;

Fig. 4 is a fragmentary rear elevational view of a portion of the machine embodying the invention with parts broken away for the sake of clarity and taken along the plane of line 4—4 of Fig. 3;

Fig. 5 is a fragmentary enlarged view partly in elevation and partly in section of a portion of the machine illustrating the solenoid and valve operating mechanism; and Fig. 6 is a fragmentary plan view taken along the plane of line 6—6 of Fig. 5.

Figure 3:
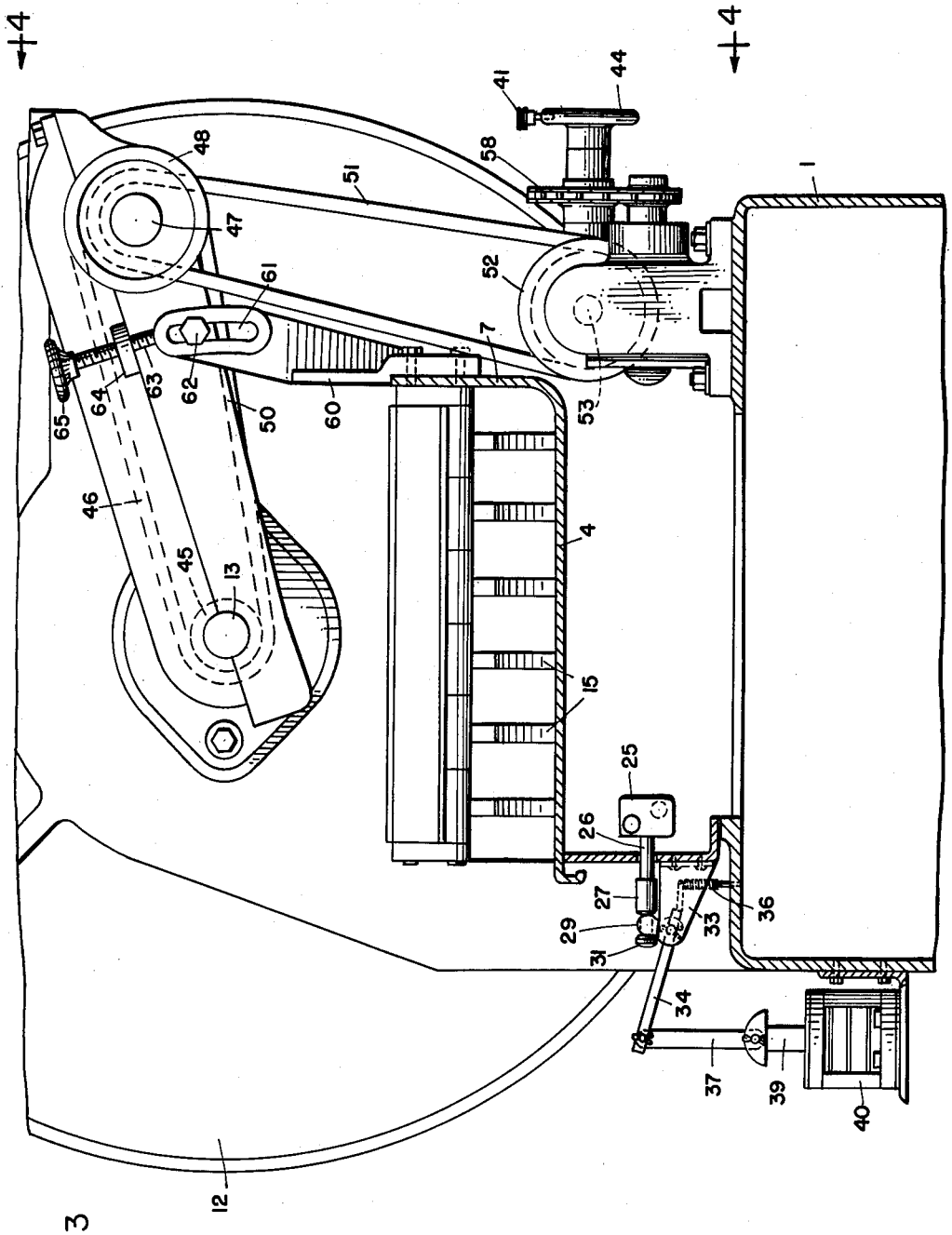
Fig. 3 is a somewhat enlarged vertical transverse sectional view through the machine and taken along the plane of line 3—3 of Fig. 1.

The machine to which the invention has been applied for illustrative purposes is a commercial machine which has been designed particularly for slicing bacon. This machine includes in general a table 1 supported by legs 2 and 3. The top 4 of the table is adapted to have the bacon or other substance placed thereon and is advanced toward the knife by means of a pusher 5. The rear end of the pusher 5 extends upwardly as at 6 and again downwardly at the rear of a vertical longitudinal guide portion 7.

While the invention herein may be adapted for use with any type of feed or driving mechanism, the particular machine illustrated herein has a fluid drive for advancing the pusher 5 toward the knife. This fluid drive includes a piston rod 8 fixed to a piston (not shown) within a cylinder 9 concealed for the sake of appearance within a covering 10 at one end of the machine. A tube or conduit 11 communicates with one end of the cylinder 9 and is adapted to have a hydraulic fluid flow therethrough under sufficient pressure to urge the piston outwardly carrying forwardly the pusher 5, to which it is connected, and the bacon or other substance on the top of the table.

The slicing knife (not shown) is concealed within a knife guard 12 and is mounted eccentrically on the main shaft 13. The knife and mounting thereof may be of the type disclosed in the United States Letters Patent No. 1,976,823 issued to William Mahler. As the shaft 13 rotates it will drive the knife and sever slices from the substance as it is advanced toward the knife by the pusher 5. The opposite end of shaft 13 is suitably mounted in bearings and is driven in any conventional and well-known manner by a driving mechanism concealed by the housing 14.

As the substance is advanced toward the knife by means of the pusher 5 under constant pressure of the fluid drive means, it will contact a plurality of conventional spring urged fingers 15 adjacent the knife. As each slice is severed at each revolution of the knife blade, it drops onto the constantly moving conveyor 16. This conveyor consists of a plurality of belts passing around the pulleys 17 and the grooved rolls 18 and 19 mounted in a swiveling yoke 20. Another grooved roll or a plurality of pulleys may be mounted on the shaft 21 and, in this particular instance, the conveyor 16 is driven by the main shaft 13 through a mechanism which will presently be described. The belts forming the conveyor 16 also pass around the grooved roll or pulleys 21 so that the grooved rolls 18 and 19 on the swiveling yoke 20 will act as tensioning means for the belts.

The main table 1 may be provided with the customary switch 22 for starting and stopping the slicer blade, the control handle 23 which actuates the rapid traverse of the pusher after the slicing operation has been completed, and the variable feed adjustment 24. As stated hereinabove, a conventional variable feed adjustment 24 is utilized for the purpose of regulating the amount of fluid entering the cylinder 9, whereby to control the speed at which the pusher 5 may advance the substance toward the knife. The knife blade rotates at a constant speed and if the substance is fed into the knife at a rapid rate, the slices will have a greater thickness than when the pusher advances the substance to the knife at a slower rate of speed. The details of operation of these various controls need not be discussed here since they are conventional in commercial machines and form no part of the present invention. It is sufficient to say that if it is determined that it will require seven slices of a particular side of bacon to make up a half pound package herein, which slices are of a predetermined thickness, then the variable feed adjustment 24 is regulated so that it will advance the pusher 5 toward the knife at a rate of speed to provide slices of that predetermined thickness.

Since these slices drop onto the moving conveyor 16 they will be shingled and each of the operators beyond the machine will remove by hand seven slices and weigh them so that the group thus removed may be packaged.

Since the variable feed adjustment cannot be too accurate when an adjustment is made for a subsequent side of bacon or other substance that is wider or thicker than a previous side, it is necessary for the operators to have at hand additional portions of a slice to add to the group to make up the necessary weight.

The present invention is designed to group the slices in accordance with the number of slices necessary to make up the required weight and is also able to be adjusted accurately to vary the number of slices in any group taking into consideration the different sizes and shapes of the substance sliced.

As pointed out above, the particular means for advancing the pusher 5 and the substance toward the knife embodies a fluid drive means. Thus, when the flow of fluid is stopped, the advancement of the pusher will also stop. Any suitable and conventional type of valve 25 (Figs. 3 and 5) may be connected with the fluid line to the pusher 5 and adapted to be operated to be opened and closed to start and stop the flow of fluid and the advancement of the pusher. A rod 26 is connected to the valve 25 and is movable inwardly to open the valve and outwardly to close the valve.

Mechanism has been provided to automatically operate the valve 25 at predetermined intervals depending upon the number of slices to be placed in a particular group. This automatic mechanism includes an attachment for the outer end of rod 26 which may comprise a main body 27 having adjacent thereto a length of smaller diameter as indicated at 28. The upper bifurcated end 29 of a link 30 is adapted to receive the portion of smaller diameter 28 whereby the upper end 29 will be positioned between the larger outer end 31 and inner end 27.

The lower end 32 of link 30 is located between the spaced sides of a bracket 33. This end 32 is formed so as to receive one end of a rod 34. The rod 34 is held in place and connected to the end 32 of link 30 by means of a pin 35. The rod 34 and link 30 are thus constrained to oscillate in unison about pin 35 as a center.

The inner end of rod 34 is connected to the body of the machine by means of a coiled spring 36 which normally maintains the inner end of rod 34 in a downward position and the outer end thereof in an upward position. At this point it will be evident that when the rod 34 is in its upper position as shown in Figs. 3 and 5, the link 30 will have its upper end moved toward the right so that the rod 26 will be moved inwardly to open valve 25. When the valve is in this position the fluid under pressure is effective to continually advance the pusher toward the knife.

The upper end of a bar 37 is received within the bifurcated outer end of rod 34 and is held in place by the pin 38. The lower end of bar 37 is fixed to the core 39 of a solenoid 40 suitably positioned and secured to the main frame of the machine. When the solenoid 40 is energized, the core 39 will move downwardly carrying with it the bar 37 and rod 34 thereby moving rod 26 outwardly and closing valve 25. When this occurs, the flow of fluid under pressure will stop and interrupt the advancement of the pusher 5 toward the knife. When the advancement of the pusher is interrupted, it has no effect on the movement of the conveyor 16 but slices will no longer be severed from the substance because it is not being fed to the knife. As soon as valve 25 is again opened the advancement of the pusher will then continue and the knife will continue to slice the substance dropping the slices onto the conveyor 16 in shingled formation until the next time the advancement of the pusher is interrupted.

The solenoid 40 is electrically connected to a suitable switch 41 (Fig. 4) which may be closed by movement of the blade 42 thereby closing the circuit and energizing the solenoid 40. The switch 41 is closed automatically at predetermined intervals of time by means of a lug 43 located on a wheel 44 mounted on the shaft 21. Each revolution of the wheel 44 will cause the lug 43 to contact blade 42 and close switch 41. The switch remains in a closed position only momentarily and is sufficient to interrupt movement of the pusher long enough to cause a space to occur on the conveyor 16 between the last slice of a preceding group of slices and the next succeeding slice.

The wheel 44 is driven from the main shaft 13 on which is mounted a pulley 45. A belt 46 passes around the pulley 45 and around another pulley mounted on a shaft 47 which forms a part of a variable speed pulley arrangement. The pulley is commercially available and its operation need not be described in detail here. It is sufficient to say, however, that this conventional variable speed pulley includes a pair of cone shaped discs which are spring loaded to retain them normally in a position close together. These two discs are clearly shown in Fig. 4 by the numerals 48 and 49.

The shaft 47 is mounted in a housing 50 and the entire assembly is movable in a manner to be described hereinafter for the purpose of altering the distance between the discs 48 and 49 to vary the speed of the mechanism driven by the variable speed pulley.

The variable speed pulley consisting of the discs 48 and 49 has a belt 51 trained therearound which belt also passes around a pulley 52 mounted on a shaft 53 at the rear of the machine. The shaft 53 is suitably mounted in bearings supported on the main frame 1 of the machine and has a worm 54 thereon. The worm 54 meshes with a worm gear 55 mounted on a shaft 56 below and extending perpendicularly to the shaft 53. Shaft 56 also has a sprocket wheel 57 thereon and a sprocket chain 58 is trained around the sprocket wheels 57 and 59. Sprocket wheel 59 is also mounted on shaft 21 whereby both the shaft 21 and wheel 44 will be driven.

It will thus be evident that while the machine is in operation and the main driving mechanism within the housing 14 is rotating the main drive shaft 13 for operating the knife, the same mechanism will drive wheel 44 and shaft 21 through the various pulley and gear arrangements just described. Rotation of shaft 21 will, of course, drive the conveyor belt 16.

Thus far it will be clear that for each revolution of wheel 44, the lug 43 thereon will contact the blade 42 and close switch 41 whereupon the solenoid 40 will be energized to close valve 25 and interrupt the advancement of the pusher 5 toward the knife.

Due to the variations in sizes and shapes of substances to be sliced, it is necessary to provide some means for regulating the means for interrupting the advancement of the pusher so that a greater or lesser number of slices may be grouped together. For example, in slicing bacon one side of bacon may be wider or thicker than another side of bacon. The slice thickness is determined by the variable feed adjustment 24. It is desirable to maintain the slices at substantially the same thickness for any particular type of substance so that in order to maintain this same slice thickness, it may be necessary to increase or decrease the number of slices in a particular group which is to maintain a predetermined weight. The manner of accomplishing this in the present invention is to increase or decrease the speed of rotation of wheel 44.

It will be clear that if the speed of advancement of the pusher is maintained constant and the speed of rotation of wheel 44 is increased, then the intervals of time between the closing of the switch 41 will be less. This means that the pusher will be interrupted in its movement toward the knife more often thereby reducing the number of slices in each group. It is likewise true that if the speed of rotation of wheel 44 is decreased then the switch 41 will be closed less often resulting in a greater number of slices in a group.

The adjustment for the rate of rotation of wheel 44 is accomplished through an adjusting mechanism which enables shaft 47 and the variable speed pulley including the discs 48 and 49 to be raised or lowered. It will be clear that of the pulley assembly is raised from its position shown in Figs. 3 and 4 the discs 48 and 49 will be spread farther apart so that the rate of rotation of pulley 52 will be decreased through the belt 51. This will, in turn, cause the wheel 44 to rotate at a slower rate thereby increasing the number of slices in a group. If, on the other hand, the variable speed pulley assembly is lowered so that the spring loaded discs 48 and 49 will be moved closer together, then the effective diameter of the variable speed pulley will be increased thereby increasing the speed of rotation of pulley 52 and wheel 44. Such an increase in speed will result in fewer slices in each group.

The adjusting mechanism includes a bracket 60 mounted at the rear of the machine having an arcuate slot 61 in the upper part thereof. A retaining bolt 62 is received by the slot 61 and is secured to the housing 50. This enables the housing and the shaft 47 mounted thereon together with the variable speed pulley mechanism to be maintained in any adjusted position. Adjustment is made by means of a screw threaded rod 63 threadedly engaging an opening in an ear 64 mounted on the outer surface of the housing 50. The upper end of rod 63 is preferably provided with a hand wheel 65 to facilitate the adjustment. When an adjustment is indicated, the bolt 62 is released and hand wheel 65 is rotated in the proper direction to raise or lower the housing 50 and its connected parts. If the housing is raised, the effective driving diameter of the variable speed pulley will be decreased thereby increasing the number of slices per group. When the hand wheel is turned to lower the housing 50 and its connected parts, the effective diameter of the variable speed pulley will be increased thereby decreasing the number of slices in each group.

Fig. 2 illustrates the result of the mechanism embodying the present invention. If it is determined, for example, that seven slices of a predetermined thickness is necessary for a predetermined weight such as a half pound or pound, then the variable speed adjustment 24 is set to advance the pusher 5 at a rate which will produce slices of the necessary predetermined thickness. The hand wheel 65 is utilized to determine the speed of rotation of wheel 44 so that after seven revolutions of the knife which will produce seven slices, the lug 43 will close switch 41 to energize solenoid 40 and stop the advancement of the pusher 5 in the manner hereinbefore described. The knife blade constantly rotates very rapidly in such machines as this and it is necessary to stop advancement of the pusher for only a period of time sufficient to cause a space between the groups equal to approximately two slices. That is to say, the conveyor 16 continues to move, but for two revolutions of the knife blade no slices will be severed from the substance because the pusher is not being advanced. As soon as the lug 43 passes the switch 41, it will be opened to de-energize the solenoid and permit the pusher advancing means to again operate. This operation then continues until the entire side of bacon, or other substance, is sliced.

If it then appears that the next side of bacon placed on the feed table is somewhat thicker or wider so that six or five slices of the same thickness will be sufficient to make up the desired weight of each group, it is a simple matter to turn the hand wheel 65 to lower the variable speed pulley mechanism so that the discs 48 and 49 will move closer together and increase the effective driving diameter of the variable speed pulley. This will increase the speed of rotation of wheel 44 thereby causing the switch 41 to close more often. This will result in a fewer number of slices per group and the adjustment may be calibrated, if so desired, to indicate what adjustment is proper to obtain a grouping of a certain number of slices of a predetermined thickness.

The present invention as hereinabove described eliminates the necessity for having a number of operators remove from the conveyor a certain number of slices which have not been grouped and then weighing these slices to insure that each group has the proper weight. Moreover, the adjustment may be quicky and easily accomplished to enable a wide variety of substances to be grouped with varying numbers of slices in each group. While the invention has been described as particularly adapted for use in a machine having a fluid drive for the pusher, it will be obvious that the necessary modifications could be made for adapting the invention to a mechanical drive without in any way departing from the spirit thereof.

Changes may be made in the form, construction and arrangement of parts from those disclosed herein without The invention is hereby claimed as follows:

1. A slicing machine comprising a table for supporting a substance to be sliced, a constant speed, continuously rotating knife at one end of the table for cutting the substance, a pusher mounted to move along the table for advancing the substance toward said knife, a continuously moving conveyor extending from said end of the table for receiving successive slices of the substance in shingled arrangement spaced in groups, hydraulic means connected to the pusher for advancing the same at a rate dependent on the rate of delivery of hydraulic fluid to said means, a valve connected for fully interrupting the flow of hydraulic fluid and the advancement of the pusher for thereby grouping the slices received by the conveyer, a solenoid connected to close said valve, a switch operable to energize the solenoid, means on a constantly rotating part of said slicing machine to engage said switch momentarily once per rotation of said part to energize the solenoid, and adjusting means to regulate the speed of said constantly rotating part to adjust the intervals between the successive switch operations to thereby regulate the number of slices in each group received on the conveyor.

2. The slicing machine as defined in claim 1 in which said constantly rotating part drives said conveyor, whereby a speed reduction thereof to increase the number of slices per group lowers the conveyor speed to maintain group sizes substantially the same irrespective of the number of slices therein.

References Cited in the file of this patent

UNITED STATES PATENTS

| | | |
|---|---|---|
| 1,846,855 | Folk | Feb. 23, 1932 |
| 1,907,621 | Van Berkel | May 9, 1933 |
| 2,047,400 | Walter | July 14, 1936 |
| 2,126,458 | Englen | Aug. 9, 1938 |
| 2,299,959 | Brentz | Oct. 27, 1942 |
| 2,426,835 | Mahler | Sept. 2, 1947 |
| 2,542,133 | Gorby | Feb. 20, 1951 |